May 4, 1943.                F. R. HOOP                    2,318,158
                          MIXING MACHINE
                       Filed March 6, 1941            3 Sheets-Sheet 1

Inventor
Fred R. Hoop
Attorneys

May 4, 1943.  F. R. HOOP  2,318,158
MIXING MACHINE
Filed March 6, 1941   3 Sheets-Sheet 2
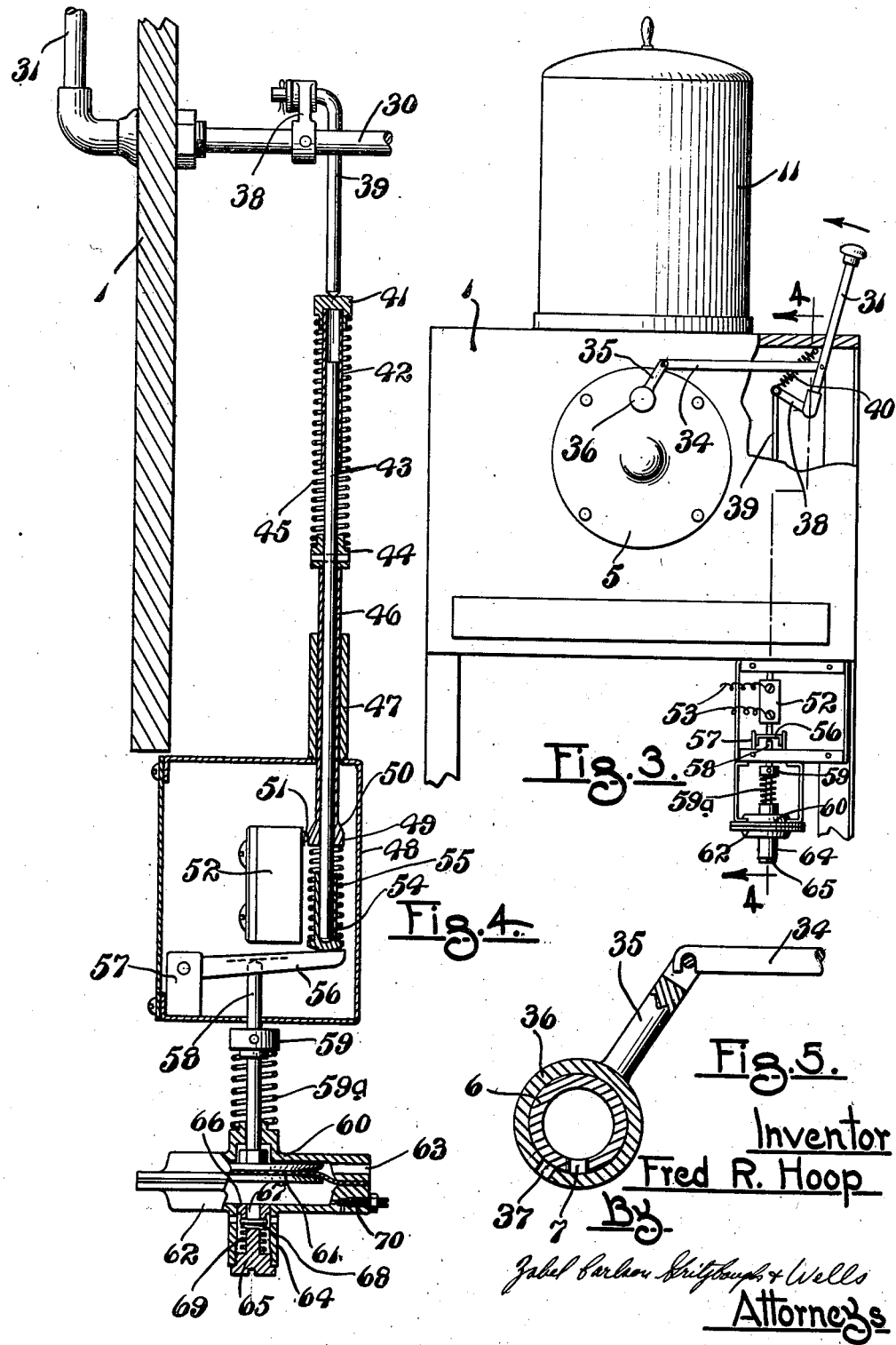
Inventor
Fred R. Hoop Inventor
Fred R. Hoop Patented May 4, 1943

2,318,158

UNITED STATES PATENT OFFICE 2,318,158

MIXING MACHINE

Fred R. Hoop, Grand Rapids, Mich., assignor to Froid Laboratories, Inc., Grand Rapids, Mich., a corporation of Michigan Application March 6, 1941, Serial No. 382,042

8 Claims. (Cl. 259—10)

This invention relates to a beverage or semi-frozen food machine of the type and character disclosed in my co-pending application, Serial No. 382,041 filed March 6, 1941. In such machine a powder of a desired preparation and composition is introduced, together with water, into a mixing and cooling receptacle in which the water and powder are thoroughly and homogeneously mixed and simultaneously conveyed lengthwise of the receptacle. Such receptacle has an outlet which is normally closed, being opened only at the time that the product is to be delivered. In its preferred form the product is semi-frozen and of thick consistency. However, the consistency of the product may be varied through the subjection of the mixed material to varying degrees of low temperature; also by varying the ingredients of the mixture. The mixing and conveying of the ingredients of the finished product is through the application of power, ordinarily an electric motor.

The present invention is concerned with the control of the electric motor so that it may be energized and started up, if it be at rest, whenever a portion of the final product is to be forced out of the machine, the closing of a switch in an electric circuit in which the motor is installed being simultaneously effected with the opening of the outlet for the delivery of the product. The closing of said outlet ordinarily would at the same time stop the motor by interrupting the circuit, but with my invention means are provided whereby the motor is kept operating and running for a limited period of time after the delivery outlet has been closed so that, as many times happens in practice, if there is a quick succession of orders to be filled, the receptacle, a cup, glass or the like, in which the product is received when delivered from the machine, may be filled to the desired extent and the delivery means then closed, yet at the same time the motor continues to run during the interval between closing the outlet and reopening it for the succeeding filling of a receptacle for a succeeding order. Thus, the motor will not be started and stopped every time that an order for the product is obtained, except of course in those cases where one order only is filled, thereby avoiding the annoyance of the noise coming from repeated stopping and starting of the electric motor and also avoiding the wear and tear on the motor which comes from an excessive number of starts and stops, particularly one after another with very short intervals between.

A further object of the invention is to feed the supply of powder and water which mixes therewith to the machine at the times that the cooled or semi-frozen product is being delivered at the outlet end, yet stop such feeding of ingredients to the machine when the delivery outlet is closed, notwithstanding that the motor continues to operate for a length of time after such closure of the delivery outlet; and, in case of filling a considerable number of orders in succession, the motor may run continuously all of the time from the filling of the first order to the last. For example, if a dozen cups or other receptacles were to be filled with the semi-frozen product, one after the other, thus necessitating opening and closing the delivery outlet a dozen times with short intervals of time between closing and opening of said delivery outlet, the motor would continue to run continuously over the entire period of time of filling the dozen orders, yet every time that the delivery outlet was closed, notwithstanding the continued operation of the electric motor, the feeding of the dry powder and water ingredients into the machine would be stopped, such feeding resuming when the delivery outlet was opened.

My invention in a simple and practical manner obtains these objects and purposes as well as many others in the way of novel constructions and arrangements of parts, all of which will appear and may be understood from the following description taken in connection with the accompanying drawings, in which:

Fig. 3 is a front elevation of the machine with a part broken away and shown in section.

Fig. 4 is an enlarged vertical section taken substantially on the plane of line 4—4 of Fig. 3, looking in the direction indicated by the arrows.

Fig. 5 is a sectional view of the delivery outlet, and

Like reference characters refer to like parts in the different figures of the drawing.

Figure 1:
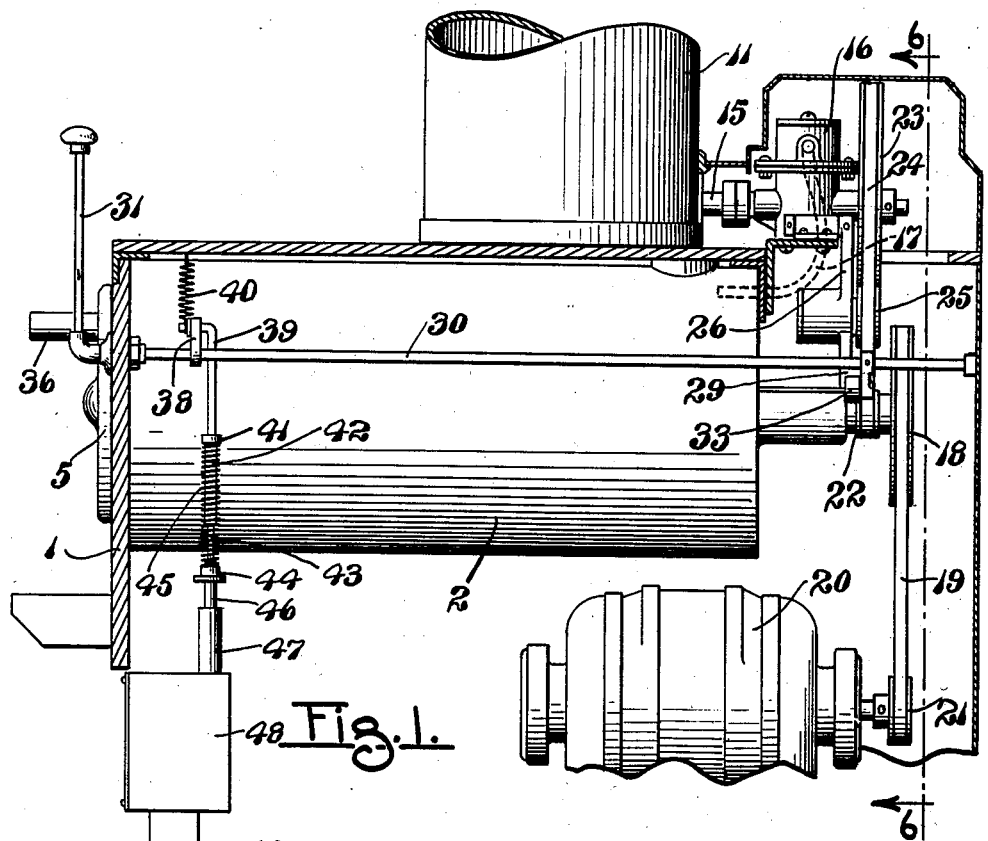
Fig. 1 is a section and elevation through the machine of my invention from the front to the rear of the cabinet in which it is installed.

Within the cabinet 1 a cylinder 2 is installed in the upper portion of the cabinet, having an inner elongated cylindrical chamber provided with a lining 3. The inner end of the cylinder is closed as at 4, while the outer end is closed by a cover member 5 from which, at the upper part thereof, a hollow cylindrical projection 6 extends, closed at its outer end and having an opening 7 at its lower side adjacent the outer end. A shaft 8 extends through the cylinder 2 on which are a plurality of mixing and conveying wheels 9 which are spaced apart at the inlet end portion of the cylinder to provide an annular mixing chamber 10 into which the ingredients which are to be mixed together and subjected to cooling are delivered.

At the top of the cabinet a holder 11 for the dry powder which is used is mounted, having a lateral outlet 12 at its lower end and at one side, from which a tubular outlet 13 extends into the mixing chamber 10 for the delivery of powder from the container 11. At the outer end of the outlet 12 there is provided a rotatable metering feed member 14 fixed at one end of a shaft 15, which shaft extends through a water pump 16 and has means thereon, as fully shown in my co-pending application, for pumping water which is forced through an outlet pipe 17 into and around the tubular member 13 and from thence into the mixing chamber 10.

The shaft 8 is equipped with a pulley 18 adapted to be driven by an endless belt 19. An electric motor 20 is provided with a drive pulley 21 on the shaft thereof around which the belt 19 passes. The shaft 8 a short distance from its rear end carries a small drive pulley 22, and the shaft 15 a large pulley 23 around which pulleys an endless belt 24 is installed so that the motor 20 may drive shafts 8 and 15 simultaneously.

Figure 6:
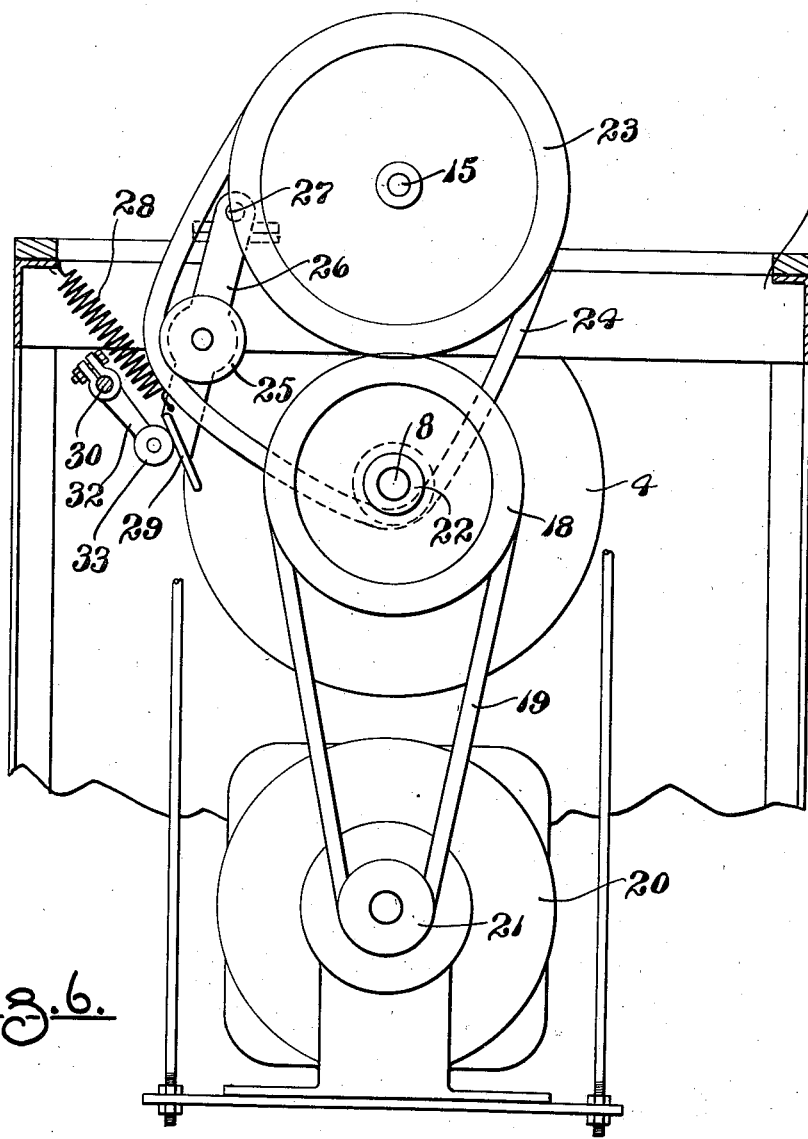
Fig. 6 is a vertical section substantially on the plane of line 6—6 of Fig. 1, looking in the direction indicated.

The belt 24 (Fig. 6) is tightened by the engagement against the inner side thereof of a tightening roller 25 rotatably mounted upon a stud shaft mounted between the ends of an arm 26 which is pivotally mounted at its upper end at 27 and is swung in a clockwise direction to tighten the belt through the influence of a coiled tension spring 28. When the belt is tightened and the electric motor 20 is running, the shaft 15 is driven by the motor simultaneously with the shaft 8.

A means is provided for swinging the arm 26 in a counterclockwise direction, and when this occurs the loosening of the belt 24 interrupts the driving of the pulley 23 so that the shaft 15 does not rotate even though motor 20 may be driving the shaft 8. At the lower end of the arm 26 is a downwardly and inwardly inclined cam member 29. A horizontal rock shaft 30 is mounted at one side of the cylinder 2 and at the front end of the cabinet is provided with an upwardly extending handle 31 for manual operation, said handle being located at the same end and a short distance to one side of the closing front 5 of the cylinder 2. An arm 32 is fixed to the shaft 30 and at its free end carries a roller 33 which bears against the cam 29. It is evident that on rocking the shaft 30 in one direction so as to swing the arm 32 in a counterclockwise movement, the belt tightening pulley 23 will be moved away from the belt 24, thereby loosening the belt so as to interrupt the driving of the shaft 15. On rocking the arm 31 in the opposite direction the spring 28 is permitted to pull the arm 26 in a clockwise direction and thereby tighten the belt, and thus drive the shaft 15 by the motor 20, if said motor is running.

A link 34 (Fig. 3) is connected at one end to the arm 31 a short distance above the rock shaft 30 and extends to and has a pivotal connection to an arm 35 extending from a covering cap 36 located over the part 6 previously described. The covering cap 36 has an opening 37 which may be brought into conjunction with the opening 7, in which case the mixed and semi-frozen product may pass from the interior chamber of the cylinder 2 outwardly through co-joined openings 7 and 37. The movement of the arm 31 to effect the conjunction of the openings 7 and 37 is toward the cap 36, this at the same time moving the arm 32 and the roller 33 away from the cam member 29, whereupon the belt 24 is tightened against the pulleys 22 and 23 by the spring 28.

The movement of arm 31 to the left (Fig. 3) likewise rocks an arm 38 connected at one end to the rock shaft 30 in a counterclockwise direction and moves a vertical rod 39 connected therewith downwardly and stretches a spring 40 which is connected to arm 38. The rod 39 at its lower end bears against the upper side of a cap 41 (Fig. 4) fixed at the upper end of a tube 42 which is telescoped over the upper end portion of a vertical rod 43. A distance below the lower end of the tube 42 a collar 44 is pinned to the rod 43 between which and the cap 41 is a coiled compressed spring 45. A tube 46 surrounds the rod 43 below the collar 44 for a distance and said tube and rod 43 within it are guided through a guide sleeve 47 which is carried on and extends upwardly from a housing 48, the tube 46 within said housing and at its lower end being enlarged in diameter as at 49 with a conical connecting surface 50 between the outer portion of the head 49 and the tube 46. This enlarged portion or head 49 of the tube when in the position shown in Fig. 4 bears against a part 51 of a make and break switch 52, the wires 53 from which (Fig. 3) lead to the motor 20; and in the position shown in Fig. 4 the switch is operated so as to break the circuit. But on the downward movement of the tube 46 so that to bring the head 49 below the part 51 of the switch, the switch closes the circuit and the electric motor starts in operation.

The lower end of the rod 43 is received in a tubular cap 54 having a closing head at its lower end between which and the lower end of the head 49 is a coiled compression spring 55. Said head of cap 54 bears against the free end of a lever or arm 56 which is pivotally mounted at its opposite end between brackets 57 carried within the housing 48. A rod 58 extends upwardly through the bottom of the housing 48 and engages against the underside of lever 56 between its ends. A collar 59 is secured to the rod 58 below the housing 48. A spring 59a is interposed between the collar 59 and an upper member 60 of a diaphragm housing. The rod 58 passes through the member 60 and has connection to a flexible diaphragm 61 clamped and secured between said upper member 60 and a lower member 62 which completes the housing. The upper member 60 has an air passing opening 63 so that the diaphragm may move rapidly in a downward direction without appreciably affecting the air pressure within the housing above the diaphragm.

The lower housing member 62 is provided with a downwardly extending sleeve 64 closed at its lower end by a plug 65 and in its upper end having a plug 66 through which a central passage 67 is made. A valve 68 is designed to engage against the lower side of the plug 66 and be held thereagainst by a coiled spring 69 to normally close the passage 67. The walls of the sleeve 64 have air outlet openings to permit air to escape when the valve 68 is lifted from its seat. At one side of the lower member 62 of the diaphragm housing is a screw threaded valve 70 which is adjustable to control the inward passage of air from the outside into the diaphragm housing below the diaphragm; and the rate of inward flow of air may be adjusted as desired and as the conditions of operation may require.

It is evident that on the movement of the lever 31 in a counterclockwise direction (Fig. 3) there is a simultaneous tightening of the belt 24 and closing of the circuit wires 53 to the electric motor 20 and a bringing of the two openings 7 and 37 into conjunction with each other. The downward movement of the rod 39 and the parts which are associated therewith causes a simultaneous downward movement of the rod 58 and a flexing of the diaphragm 61 to a lower position, the air being expelled from the housing below said diaphragm through the passage at 67, valve 68 being pushed downwardly by air pressure so as to let the air very quickly and rapidly escape. The motor immediately starts in operation and mixes the powder and water within the cylinder 2 and forces it to the left outwardly through the joined delivery outlets 7 and 37. At the same time the shaft 15 is driven so that powder from the powder holding receptacle 11 and water pumped by the water pump 16 through the tube 17 come into the cylinder 2 at the mixing chamber portion 10 thereof. Thus, as the finished and semi-frozen product is delivered at the outlet end of the cylinder through the openings 7 and 37 which are in conjunction with each other, the dry powdered material and the water to mix therewith are simultaneously delivered into the mixing chamber adjacent the other or inner end of said cylinder.

Figure 2:
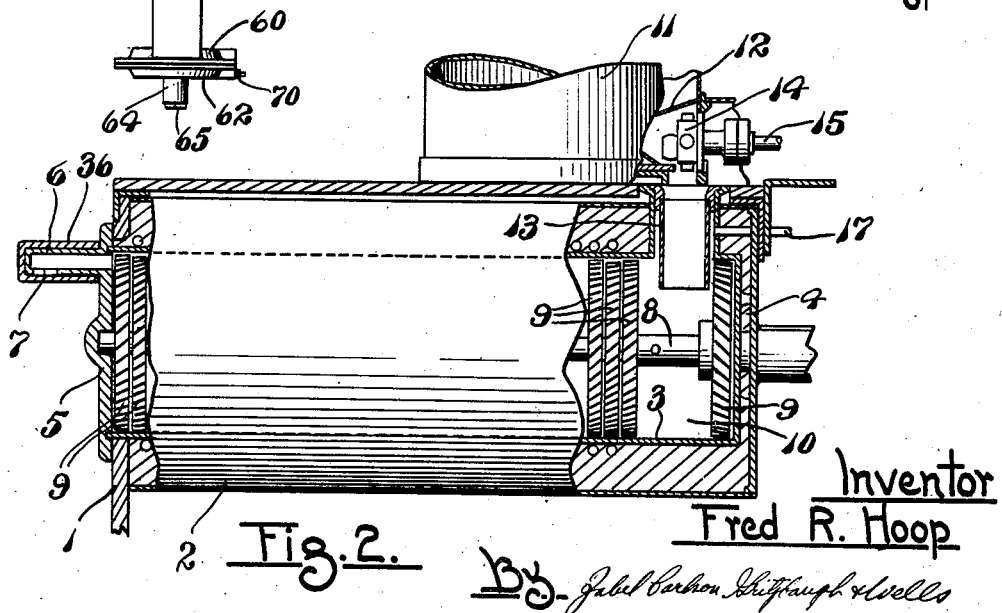
Fig. 2 is a section and elevation similar to that shown in Fig. 1, each end of the mixing and cooling cylinder being shown in section.

The operator holds the lever 31 in the position to the left to which it has been rocked until the receptacle, such as a paper cup or the like which is to receive the product and which is held underneath the openings 7 and 37, is filled to the desired extent and then releases handle 31 which, under the influence of spring 40 returns to its initial position, rocking the shaft 30 in the opposite direction, lifting the rod 39 and bringing the roller 32 against the cam 29 to move the belt tightener 25 to an inoperative position. It is to be understood that the strength of the spring 40 is greater than that of the spring 28. When this occurs the driving of the shaft 15 is stopped and there is no further feeding of the powder and water into the cylinder. At the same time such movement of the lever 31 back to initial position moves the sleeve 36 to the position shown in Fig. 5 and stops any delivery of semi-frozen material from the cylinder even though the shaft 8 continues to turn. Such rotation of the shaft 8 will thereupon merely attempt to convey the materials to the left (Fig. 2) but as the disks 9, like those shown in my copending application, comprise separated radially extending blades, such pressure is not excessive and the rotation of the shaft 8 may continue without detriment.

But the motor 20 does not immediately stop, for the reason that the diaphragm 61 is at its lowermost position within the diaphragm housing 70 and can return toward upper position only as fast as the entrance of air past the check valve 70 permits. Accordingly, when the handle 31 is released and rock shaft 30 is swung back to its original position under the influence of the spring 40 with a closure of the opening at 7 and a loosening of the belt 24, the rod 39 is lifted and is followed by the cap 41 because of the extension of spring 45, but the rod 43 remains at its lower position and is lifted gradually and slowly as air slowly enters underneath the diaphragm 61. The spring 59a exerting an upward pull on the diaphragm will produce a vacuum in the diaphragm housing below the diaphragm tending to draw air in past the valve at 70, while the valve at 68 is held tightly in closed position. The sleeve 46 and the switch operating head 49 at its lower end can move upwardly only as fast as rod 43 moves. The switch control member 51 will not be operated to break the current going to the electric motor until said rod 43 and the sleeve 46 therewith are lifted to substantially the position shown in Fig. 4, whereupon the motor will stop.

It is evident therefore that in the regular operation of the machine, as in an ice cream parlor, drug store or the like, if a customer orders one cup only of the semi-frozen beverage or food, the operator will swing the lever 31 to the left (Fig. 3), hold it in such position until the cup is filled to the desired extent and then release the lever. The motor will not stop at once but will continue to run for some little time after the lever is released. But the feeding of powder from the powder supply in the receptacle 11 and of water into the cylinder will stop as soon as the lever is released and the passage outwardly of the semi-frozen confection has stopped. In many cases however, ordering of one cup only will not be the rule but there will be an order for two or more cups of the semi-frozen confection. In such case the operator will fill the first cup the same as before, releasing the lever 31 to return to its initial position after one is filled, then picking up another and turning the lever to open the outlet opening for filling the second cup; and the procedure may continue indefinitely so long as there are cups to be filled. In every case where the lever is released and the outward flow of the product is stopped there is a simultaneous stopping of the supply of the powder and water to be mixed therewith into the cylinder. But the motor will keep on running. This avoids the continual stopping and restarting of the motor for each of the cups of the product which is to be served. Such avoidance of many stops and starts of the driving motor 20 is very desirable both on account of the undesirable noise of restarting the motor and also because of the detrimental effect to which the mechanism may be subjected through a large number of stops and starts taking place in a short time.

The invention is of a very practical and useful character. It is defined in the appended claims and is to be considered comprehensive of all forms of structure coming within their scope.

I claim:

1. A machine of the class described comprising, a mixing chamber adapted to receive food ingredients and water to mix therewith, said chamber having an inlet near one end and an outlet near its opposite end, a rotatable shaft having agitating and advancing members thereon located within the chamber, a closure for the outlet, manually operable means for moving said closure to open or close the outlet, an electric motor, means for driving said shaft from the electric motor, an electric circuit in which the motor is located, feeding means for said food ingredients, a water pump for water, means for simultaneously driving said feeding means and water pump from said shaft, a switch in said circuit operatively connected with said manually operable means to close when said closure means is moved to outlet open position and released for opening when the outlet is closed, means for rendering the driving means for said feeding means and water pump inoperative when the closure is moved to outlet closing position, and means for retarding the opening of said switch for a period of time after said closure is moved to outlet closing position.

2. A machine of the class described comprising, a mixing chamber adapted to receive food ingredients and water to mix therewith, said chamber having an inlet near one end and an outlet near its opposite end, a rotatable shaft with agitating and advancing members thereon located within the chamber, an electric motor, a circuit in which the electric motor is located, a switch in said circuit, a closure for the outlet, manually operable means for moving said closure to close or open said outlet and to simultaneously close said switch when said outlet is opened and to release the switch for closing when said outlet is closed, feeding means for said food ingredients, a water pump for water, means for driving said feeding means and water pump from said motor, means for rendering said driving means operative when the said closure is moved to open position and inoperative when said closure is moved to outlet closing position, and means for retarding the opening of said switch when it is released upon manually closing said outlet.

3. In a machine of the class described, a mixing chamber adapted to receive food ingredients and water to mix therewith, said chamber having an inlet near one end and an outlet near its opposite end, a rotatable shaft having mixing and advancing members thereon located within the chamber, a closure for the outlet, an electric motor, means for driving the shaft from the electric motor, feeding means for said food ingredients, a water pump for water, means for simultaneously driving said feeding means and water pump from said shaft, a rock shaft, a handle for manually operating the rock shaft, connections between said handle and the outlet closure for opening or closing said outlet on operation of said handle in opposite directions, an electric circuit in which the motor is located, a switch in said circuit, means operated by said rock shaft for closing the switch when the outlet is opened and opening the switch when the outlet is closed, and means operated by said rock shaft for rendering the driving means for the food ingredient feeding means and water pump operative when the closure is manually moved to outlet open position and inoperative when said closure is moved to outlet closing position.

4. In a machine of the class described, a mixing chamber for food ingredients and water having an inlet and outlet near opposite ends, a rotatable shaft with mixing and advancing means thereon located within the chamber, a closure for the outlet, an electric motor, means for driving the shaft from the electric motor, feeding means for the food ingredients and a water pump for the water, a belt for driving said feeding means and water pump from said shaft, a rock shaft, a manually operated handle connected therewith, connections between said handle and the outlet closure for opening or closing said outlet on operation of the handle in opposite directions, an electric circuit in which the motor is located, a switch in said circuit, means operated by said rock shaft for closing the circuit when the outlet is opened and opening the switch when the outlet is closed, belt tightening means for said belt, and means actuated by the rock shaft for tightening said belt when the outlet closure is moved to open position and for loosening said belt when it is moved to closing position.

5. In a machine of the class described, a mixing chamber for reception of food ingredients and water, said chamber having an inlet and an outlet near its opposite ends, means within the chamber for mixing water and food ingredients and advancing the same toward said outlet end of the chamber, an electric motor for driving said means, means for feeding food ingredients and water into the chamber at its inlet end, means for driving said last mentioned means from the electric motor, a closure for the outlet, manually operable means for moving said closure to either open or closed position, an electric circuit for the motor, a switch in said circuit, means for closing said switch to start the motor when the outlet is opened, means for retarding the opening of the switch upon closing the outlet, and means for rendering the operation of said food ingredient and water feeding means inoperative when said outlet is closed, said electric motor driving the mixing and advancing means for a predetermied period of time after the outlet is closed, measured by the retardation of opening the switch, substantially as described.

6. In a construction of the class described, an elongated receptacle having a chamber therein to receive ingredients to be mixed together, said chamber having an inlet and outlet near its opposite ends, mixing and conveying means within the chamber for mixing said ingredients and moving them toward the outlet end thereof, means for driving said mixing and conveying means, means for feeding the ingredients to be mixed into the chamber, a closure for the outlet, manually operable means for moving said closure to open or closed position, means operated simultaneously with said manually operable means for rendering said feeding means operative when the outlet is opened or inoperative when the said outlet is closed, and means becoming operative upon movement of said manually operable means to outlet closing position to stop said driving means after a predetermined time, said last named means being rendered inoperative to stop said driving means by return of said manually operable means to outlet opening position before the end of said predetermined time.

7. In a construction of the class described, an elongated receptacle having a chamber therein to receive ingredients to be mixed together, said chamber having an inlet and outlet near its opposite ends, mixing and conveying means within the chamber for mixing said ingredients and moving them toward the outlet end thereof, means for driving said mixing and conveying means, means for feeding the ingredients to be mixed into the chamber, a closure for the outlet, manually operable means for moving said closure to open or closed position, and control mechanism for said driving means becoming operative upon opening movement of said closure by said manually operable means to cause actuation of said mixing and conveying means, said control mechanism including time delay means causing the driving means to cease actuation of the mixing and conveying means only after said closure is in closed position for a predetermined time, whereby successive manual opening and closing of the outlet closure may be made without stopping the mixing and conveying means.

8. A device of the character described comprising a cooling chamber having an inlet and an outlet, mixing means in said chamber, drive means for driving said mixing means, a closure for said outlet, manually operable means for moving said closure to open or closed position, and control mechanism for said driving means operable in response to opening movement of said closure by said manually operable means to cause actuation of said mixing means, said control mechanism including time delay means causing the driving means to cease actuation of the mixing means only after said closure is in closed position for a predetermined time, whereby successive openings and closings of the outlet closure may be made without stopping the mixing operation.

FRED R. HOOP.